US012792065B2

(12) United States Patent
Choi et al.

(10) Patent No.: US 12,792,065 B2
(45) Date of Patent: Nov. 10, 2026

(54) VEHICLE-TO-VEHICLE RANGING TRAVELING METHOD APPLIED WITH REINFORCEMENT LEARNING USING A POSITIONING SENSOR

(71) Applicants: HYUNDAI MOTOR COMPANY, Seoul (KR); KIA CORPORATION, Seoul (KR)

(72) Inventors: Jung-Hun Choi, Hwaseong-si (KR); Dong-Chul Lee, Hwaseong-si (KR); In-Soo Jung, Hwaseong-si (KR); Jae-Min Jin, Hwaseong-si (KR); Kyoung-Jin Noh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/253,470

(22) Filed: Jun. 27, 2025

(65) Prior Publication Data

US 2026/0288174 A1 Sep. 24, 2026

(30) Foreign Application Priority Data

Mar. 24, 2025 (KR) ........................ 10-2025-0037328

(51) Int. Cl.
*G05D 1/698* (2024.01)
*B60W 30/165* (2020.01)
(Continued)

(52) U.S. Cl.
CPC ......... *G05D 1/6985* (2024.01); *B60W 30/165* (2013.01); *G01S 13/0209* (2013.01); *H04W 4/46* (2018.02); *B60W 2420/408* (2024.01); *B60W 2520/10* (2013.01); *B60W 2520/14* (2013.01); *B60W 2540/18* (2013.01);
(Continued)

(58) Field of Classification Search
CPC .... G05D 1/6985; H04W 4/46; G01S 13/0209
See application file for complete search history.

(56) References Cited

U.S. PATENT DOCUMENTS 10,684,352 B2 6/2020 El Assaad
2017/0176575 A1* 6/2017 Smits .................... G01S 7/4808
(Continued)

FOREIGN PATENT DOCUMENTS

EP 3495836 B1 8/2022
KR 102235198 B1 3/2021
(Continued)

*Primary Examiner* — Hunter B Lonsberry
(74) *Attorney, Agent, or Firm* — Lempia Summerfield Katz LLC

(57) ABSTRACT

In a vehicle-to-vehicle ranging control method for cooperative traveling, the inter-vehicle distance between an ego vehicle and a leading adjacent vehicle is corrected through reinforcement learning using vehicle information and positioning data exchanged between the two vehicles. The vehicle-to-vehicle ranging control method may use reinforcement learning based on the positioning data from at least one positioning sensor. The reinforcement learning may include applying a reward function to maintain a matching error between the vehicle information of the ego vehicle and the adjacent vehicle within a predetermined range.

18 Claims, 5 Drawing Sheets

(51) Int. Cl.

| | |
|---|---|
| ***G01S 13/02*** | (2006.01) |
| ***G05D 101/15*** | (2024.01) |
| ***G05D 109/10*** | (2024.01) |
| ***G05D 111/30*** | (2024.01) |
| ***H04W 4/46*** | (2018.01) |

(52) U.S. Cl.

CPC . *B60W 2554/4042* (2020.02); *B60W 2556/65* (2020.02); *G05D 2101/15* (2024.01); *G05D 2109/10* (2024.01); *G05D 2111/30* (2024.01)

(56) References Cited

U.S. PATENT DOCUMENTS

| | | | | |
|---|---|---|---|---|
| 2019/0195982 | A1 | 6/2019 | El Assaad | |
| 2022/0221550 | A1 | 7/2022 | Hága et al. | |
| 2024/0077888 | A1 | 3/2024 | Ha et al. | |
| 2024/0094328 | A1 | 3/2024 | Choi et al. | |
| 2024/0174236 | A1* | 5/2024 | Jeon | B60W 40/08 |

FOREIGN PATENT DOCUMENTS

| | | | |
|---|---|---|---|
| KR | 20240031635 | A | 3/2024 |
| KR | 20240039617 | A | 3/2024 |
| KR | 20240099771 | A | 7/2024 |

* cited by examiner

<Relative Motion Model>

VEHICLE-TO-VEHICLE RANGING TRAVELING METHOD APPLIED WITH REINFORCEMENT LEARNING USING A POSITIONING SENSOR

CROSS-REFERENCE TO RELATED APPLICATION

This application claims the benefit of and priority to Korean Patent Application No. 10-2025-0037328, filed on Mar. 24, 2025, the entire contents of which are hereby incorporated herein by reference.

BACKGROUND

Technical Field

The present disclosure relates to a vehicle-to-vehicle (V2V) ranging traveling method using a positioning sensor as a vehicle-to-vehicle communication means.

Description of Related Art

A vehicle-to-vehicle (V2V) communication technology allows vehicles to share traveling information and surrounding situations in real time through wireless communication. For example, relative locations between vehicles can be tracked by exchanging data, such as traveling paths, speeds, locations, and the like, through a communication module, Global Positioning System (GPS), and radar and LiDAR sensors that are mounted on the vehicles.

In this way, a V2V communication-based location tracking technology is attracting attention as a core technology of future transportation systems, such as reducing traffic accidents, increasing road efficiency, and advancing an autonomous driving technology. V2V technology may be used to make traffic flow on the road smoother and to prevent dangerous situations in which visibility is not secured due to vehicle collisions, intersection accidents, and obstacles.

Accordingly, the V2V communication-based location tracking technology overcomes limitations of simple GPS-based location determination, and the need for predicting locations of other vehicles is increasing even in situations in which visibility is not secured through communication signals.

SUMMARY OF THE DISCLOSURE

Embodiments of the present disclosure provide a vehicle-to-vehicle ranging control method applying reinforcement learning using a positioning sensor capable of serving as a sensor for reducing accidents that may occur due to a failure to recognize other vehicles, such as blind spots, and allowing a leading vehicle to notify a following vehicle of a danger ahead in advance.

According to an embodiment, a vehicle-to-vehicle ranging control method applying reinforcement learning using a positioning sensor is provided. The method includes correcting ranging between the Ego vehicle and an Adjacent vehicle through reinforcement learning by pieces of vehicle information and positioning nodes of the Adjacent vehicle and the Ego vehicle, wherein the Adjacent vehicle is a leading vehicle and the Ego vehicle communicates with and follows the Adjacent vehicle and may apply a reward function so that a matching error with the vehicle information is within a predetermined range.

In an embodiment, input data of the reinforcement learning may include one or more of location vectors, angles, or geometric triangles between the positioning node of the Ego vehicle and the positioning node of the Adjacent vehicle.

In an embodiment, the state vector including one or more of relative locations or relative yaw rates (rotational speeds) of the Ego vehicle in x and y directions with respect to the Adjacent vehicle, or a speed and curvature of the leading Adjacent vehicle may be added to the input data of the reinforcement learning.

In an embodiment, as the input data of the reinforcement learning, the vehicle information may include one or more of heading, speed, or yaw rate of the Adjacent vehicle or the Ego vehicle.

According to another embodiment, a vehicle-to-vehicle ranging traveling method applied with reinforcement learning using a positioning sensor is provided. The method including extracting one or more of location vectors, angles, or geometric triangles at a positioning node of each of a turning Ego vehicle and an Adjacent vehicle leading the Ego vehicle, extracting a state vector by relative motion of the Adjacent vehicle with respect to the turning Ego vehicle, extracting one or more of heading, a speed, or a yaw rate from the Adjacent vehicle, and correcting an error for ranging between the turning Ego vehicle and the Adjacent vehicle leading the Ego vehicle through reinforcement learning using one or more of the state vectors, the location vectors, the angles, or the geometric triangles that are extracted from the positioning nodes and one or more of the heading, the speed, or yaw rate that are extracted from the Adjacent vehicle as input data of deep learning.

As the effects of the present disclosure, first, when various sensors may not recognize surrounding vehicles at corner blind spots, recognition and traveling through the positioning of the UWB sensor are made possible.

Second, when real-time events occur or the occurrence of events is sensed in the leading vehicle at corner blind spots, information can be transmitted to the following vehicle to be notified of a danger in advance. Accordingly, the present technology can also be applied to a positioning technology of reflecting the traffic information collected by the leading vehicle in real time and directly transmitting the traffic information to the following vehicle at high speed without communication delay.

For example, in a tunnel, which is a GPS shadow zone, information about the occurrence of real-time events, such as sensing of a pedestrian, may be transmitted to the following vehicle through vehicle-to-vehicle direct communication using the local sensor, and thus the embodiments of the present disclosure may be used as a redundancy system for other sensors.

In addition, embodiments of the present disclosure may be one of core technologies of autonomous driving vehicles, and advanced traveling scenarios, such as platooning and passing an intersection without traffic lights, are possible by allowing multiple vehicles to share their traveling information in real time.

DETAILED DESCRIPTION

Terms such as "comprising" used herein should not be construed as necessarily including all of various components described in the present disclosure and should be construed as not including some of the components or further including additional components, in some embodiments.

In the present disclosure, when a component, controller, device, element, apparatus, unit or the like of the present disclosure is described as having a purpose or performing an operation, function, or the like, the component, controller, device, element, apparatus, unit or the like should be considered herein as being "configured to" meet that purpose or to perform that operation or function. Each component, controller, device, element, apparatus, unit, server, and the like may separately embody or be included with a processor and a memory, such as a non-transitory computer readable media, as part of the apparatus.

According to embodiments of the present disclosure, a first vehicle, also sometimes referred herein as an "Ego" vehicle, may be an autonomous driving vehicle or a host vehicle with a driver as a reference and is intended to track relative motion of a second vehicle, also sometimes interchangeably referred to herein as an "Adjacent" vehicle or "Surround" vehicle, to recognize surrounding situations, prevent collisions, plan routes, perform cooperative driving, etc. In various embodiments, the Ego vehicle follows the Adjacent vehicle, the Adjacent vehicle leads the Ego vehicle, and a local coordinate system that models the relative motion of the Adjacent vehicle with respect to the Ego vehicle is applied. As used in the present disclosure, a "leading vehicle" may be a vehicle driving at least partially ahead of a "following vehicle". Similarly, as used herein, a "following vehicle" may be a vehicle driving at least partially behind a "leading vehicle".

In various embodiments, the Adjacent vehicle may be another vehicle or a road user that shares a behavioral state between vehicles around the Ego vehicle. Relative locations and relative speeds of the Ego vehicle and the Adjacent vehicle are calculated, which affects the behavior and determination of the Ego vehicle. Such calculation may be performed by a vehicle controller of the Ego vehicle or in an external server that communicates with the Ego vehicle and the Adjacent vehicle.

According to embodiments of the present disclosure, a motion model in which the Ego vehicle follows the Adjacent vehicle is constructed, and according to the constructed motion model, traveling of the Ego vehicle is guided according to traveling of the Adjacent vehicle from positioning sensors (e.g., UWB sensors) and vehicle information of the Ego vehicle and the Adjacent vehicle.

Figure 1:
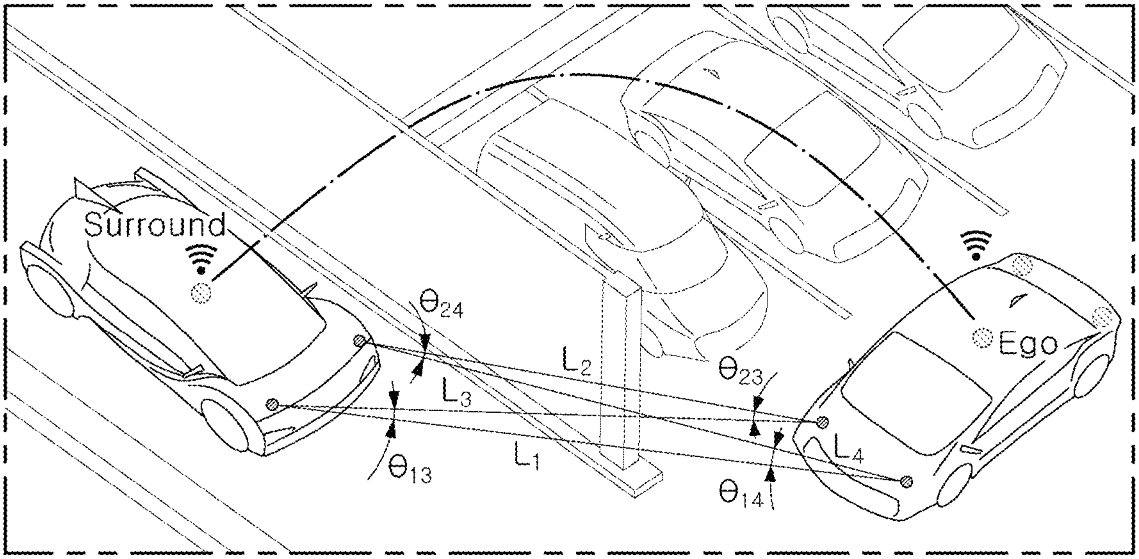
FIG. 1 illustrates a system modeling relative motion between a host vehicle Ego and a surrounding vehicle Surround, according to an embodiment of the present disclosure.

FIG. 1 illustrates a system modeling relative motion between a host vehicle Ego and a surrounding vehicle Surround, according to an embodiment. Positioning sensors of the Ego vehicle and the Surround vehicle may be referred to as positioning nodes, and distances between positioning nodes L1 to L4 and positioning node angles between L1 to L4 vary according to the location of a counterpart vehicle.

In a vehicle dynamics-based model (relative motion model), the movement of the Ego vehicle is described according to the dynamic equation, where main parameters $F_x$ and $F_y$ denote forces acting on the Ego vehicle and generate linear accelerations in x and y directions, respectively, and $\Psi$ (Yaw rate) denotes a rotational speed or rotational rate of a vehicle.

The relative moving speed and direction (linear speed and angular speed) of the Adjacent vehicle with respect to the Ego vehicle are represented as the local coordinate system. The Adjacent vehicle may calculate a relative location and speed with respect to the Ego vehicle. The relative location and speed may be represented as a vector R (relative speed) and R (relative location). The reason for calculating the relative location or speed in the local coordinate system is to reduce the amount of calculation by directly applying information collected from the positioning sensor.

The relative speed $\dot{R}$ may be represented by Equation 1, in which $$C_L^F$$

denotes a rotational matrix for coordinate system transformation of a vehicle, and the entire first term is a term that transforms the speed of the Adjacent vehicle measured in the local coordinate system of the Ego vehicle into a reference (fixed) coordinate system in the local coordinate system.

The second term represents the speed of the Ego vehicle in the reference (fixed) coordinate system, and a negative number represents a relative speed between the first and second terms.

In the third term, $\omega_F$ denotes the Yaw rate $\Psi$ of the Ego vehicle, and is the product of the rotational speed with respect to the location of the Adjacent vehicle (the leading vehicle) in the y direction as a y-axis component of the relative location R and the location of the Adjacent vehicle in the x direction as an x-axis component of the relative location R with respect to the Ego vehicle (the following vehicle).

$$\dot{R} = C_L^F\begin{bmatrix} v_{Lx} \\ v_{Ly} \end{bmatrix} - \begin{bmatrix} v_{Fx} \\ v_{Fy} \end{bmatrix} + w_F\begin{bmatrix} R_y \\ -R_x \end{bmatrix} \quad \text{(Equation 1)}$$

In embodiments of the present disclosure, the relative location and the relative motion may be estimated through mutual UWB communication-based measurement according to relative locations and relative speeds between the Ego vehicle and the Adjacent vehicle by the vehicle dynamics-based model. Here, K denotes a Kalman filter. In an embodiment, the relative speed and relative location of the Adjacent vehicle with respect to the Ego vehicle may be collected from the UWB sensors located in each vehicle.

In the UWB-based relative motion, r denotes a measured distance between the Ego vehicle (UWB nodes 0 and 1) and the Adjacent vehicle (UWB nodes 2 and 3), and accordingly, relative locations between the vehicles, e.g., relative distances and angles, may be calculated.

(Step 1) Vehicle Behavior Model

Figure 2:
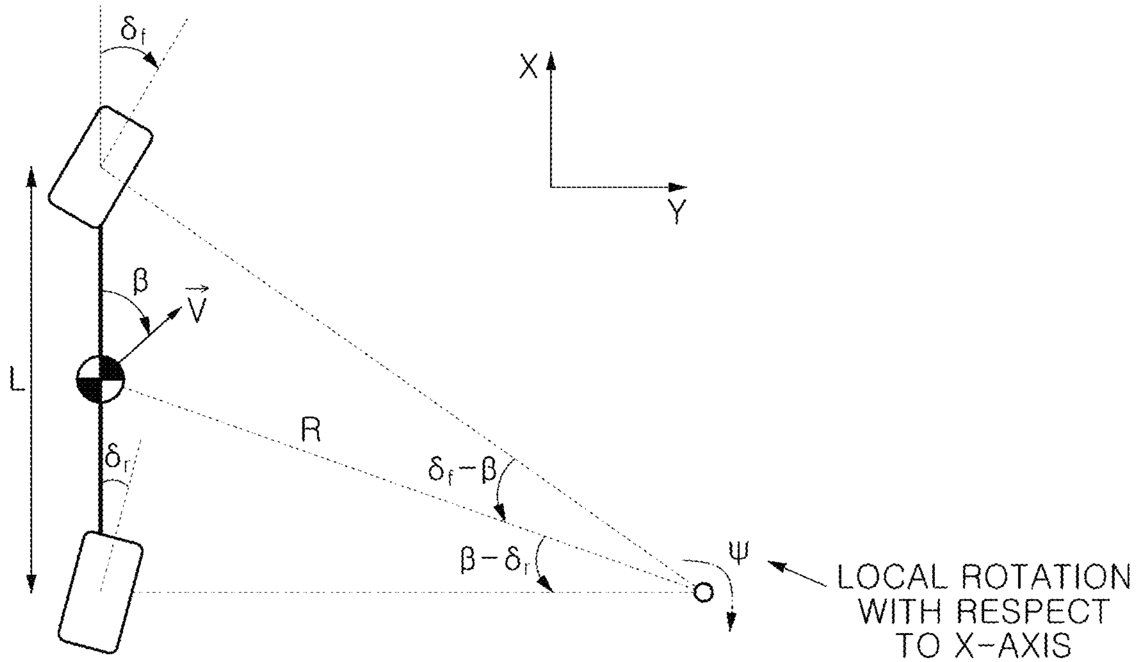
FIG. 2 is a view illustrating a bicycle model, which is a one-degree-of-freedom model, of a vehicle behavior model, according to an embodiment of the present disclosure.

Referring to FIG. 2, the vehicle behavior model, according to an embodiment of the present disclosure, is defined as a bicycle model. The bicycle mode may be a one-degree-of-freedom model. Each of the front and rear axles are coupled to a single wheel (e.g., a front wheel and a rear wheel, respectively) with an average steering angle, and the movement around point O is represented by Equations 2, 3, and 4. The bicycle model of FIG. 2 is a model suitable for associating a speed and steer angle of the leading vehicle with a yaw rate, a main variable is a relationship between a steering angle, slide slip, and wheelbase and the yaw rate, and the effective steer angle and yaw rate may be organized by Equations 5 and 6.

$$\dot{X} = V\cos(\psi + \beta) \quad \text{(Equation 2)}$$

$$\dot{Y} = V\sin(\psi + \beta) \quad \text{(Equation 3)}$$

$$\dot{\psi} = \frac{V\cos(\beta)}{L}(\tan(\delta_f) - \tan(\delta_r)) \quad \text{(Equation 4)}$$

$$\dot{\psi} = \frac{V\tan(\delta)}{L} \quad \text{(Equation 5)}$$

$$d_L = \frac{\tan(\delta)}{L} \quad \text{(Equation 6)}$$

Equations 2 and 3 represent a speed of a vehicle in a moving direction as speeds in X-axis and Y-axis directions, respectively. ψ denotes a yaw angle of the vehicle, and β denotes a slip angle, which is a difference between the moving direction of the vehicle and an axis direction of the vehicle (toward a vehicle body).

Equation 4 represents the yaw rate of the vehicle. Of denotes a front wheel steering angle, $\delta_r$ denotes a rear wheel steering angle, and L denotes a wheelbase and a distance between the front and rear wheels of the vehicle. That is, the vehicle turns in proportion to a difference in steering angles between the front and rear wheels.

In Equation 5, δ denotes the yaw rate of the vehicle with respect to the effective steer angle, and when the slip angle is not applied and no rear wheel steering exists, $\delta=\delta_f$.

Equation 6 represents a curvature at the effective steering angle. The left side of Equation 6 is the curvature, which is the reciprocal of a turning or rotational radius (1/R).

(Step 2) Relative Motion Model

Figure 3:
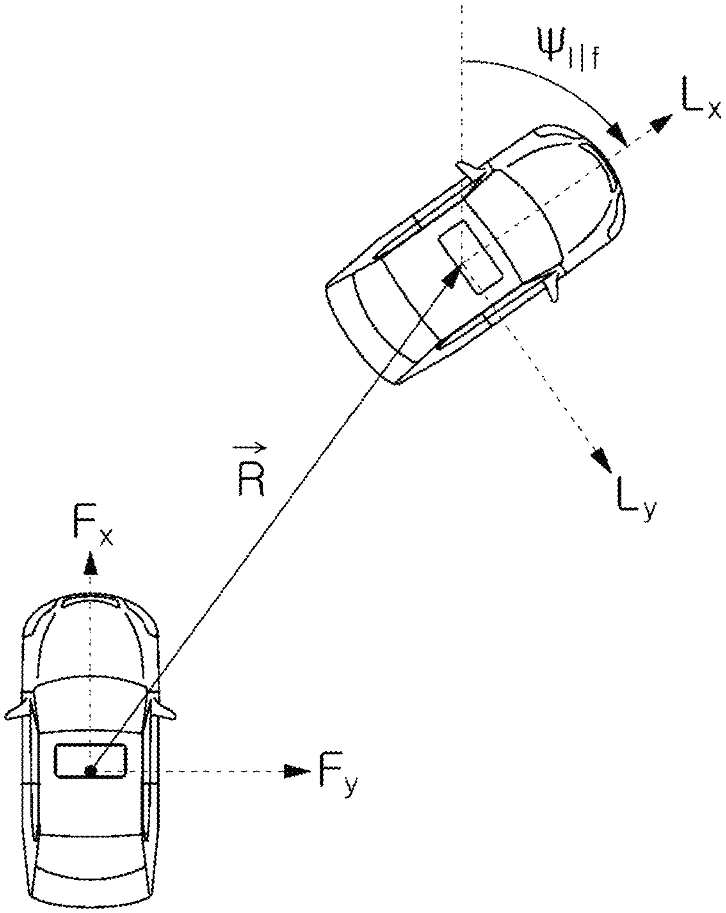
FIG. 3 is a view illustrating a relative motion model of a leading vehicle L and a following vehicle F, according to an embodiment of the present disclosure.

FIG. 3 illustrates the relative motion model, and is a conceptual diagram of how relative pose estimation is performed within ($F_x$, $F_y$) of the following vehicle when the leading vehicle is marked as L and the following vehicle is marked as F, and the relative motion varies according to the speed of the following vehicle, the speed of the leading vehicle, and the yaw rate ($w_F$) of the following vehicle over time, according to an embodiment.

Referring to Equation 1, the relative location is updated in real time according to the speeds of the leading and following vehicles, and the yaw rate ($w_F$) of the following vehicle.

The last term of Equation 1 considers the relative speed of the leading vehicle due to the rotation of a follower frame. The above $$C_L^F$$

is a rotational matrix for the coordinate system transformation of the vehicle and is a rotational matrix related to the leading vehicle and the following vehicle through Equation 7 of a relative direction L/F.

$$C_L^F = \begin{bmatrix} \cos(\psi_{L/F}) & -\sin(\psi_{L/F}) \\ \sin(\psi_{L/F}) & \cos(\psi_{L/F}) \end{bmatrix} \quad \text{(Equation 7)}$$

The relative direction is updated according to Equation 8 by a difference between the yaw rate of the leading vehicle and the yaw rate of the following vehicle in the relationship between the Adjacent vehicle (the leading vehicle) and the Ego vehicle (the following vehicle). The yaw rate of the leading vehicle may be roughly calculated using a current estimated value of the leading vehicle. The speed of the leading vehicle is considered in a vertical direction (x direction) in Equation 9, and thus $V_{Ly}=0$ and $V_L=V_{Lx}$.

$$\dot{\psi}_{F/L} = w_L - w_F \quad \text{(Equation 8)}$$

$$w_L = v_L d_L \quad \text{(Equation 9)}$$

The yaw rate of the leading vehicle may be calculated in Equation 9, and the relative yaw rate between the leading vehicle and the following vehicle is calculated by substituting the calculated yaw rate of the leading vehicle into Equation 8.

(Step 3) Relative Location Estimation

Figure 4:
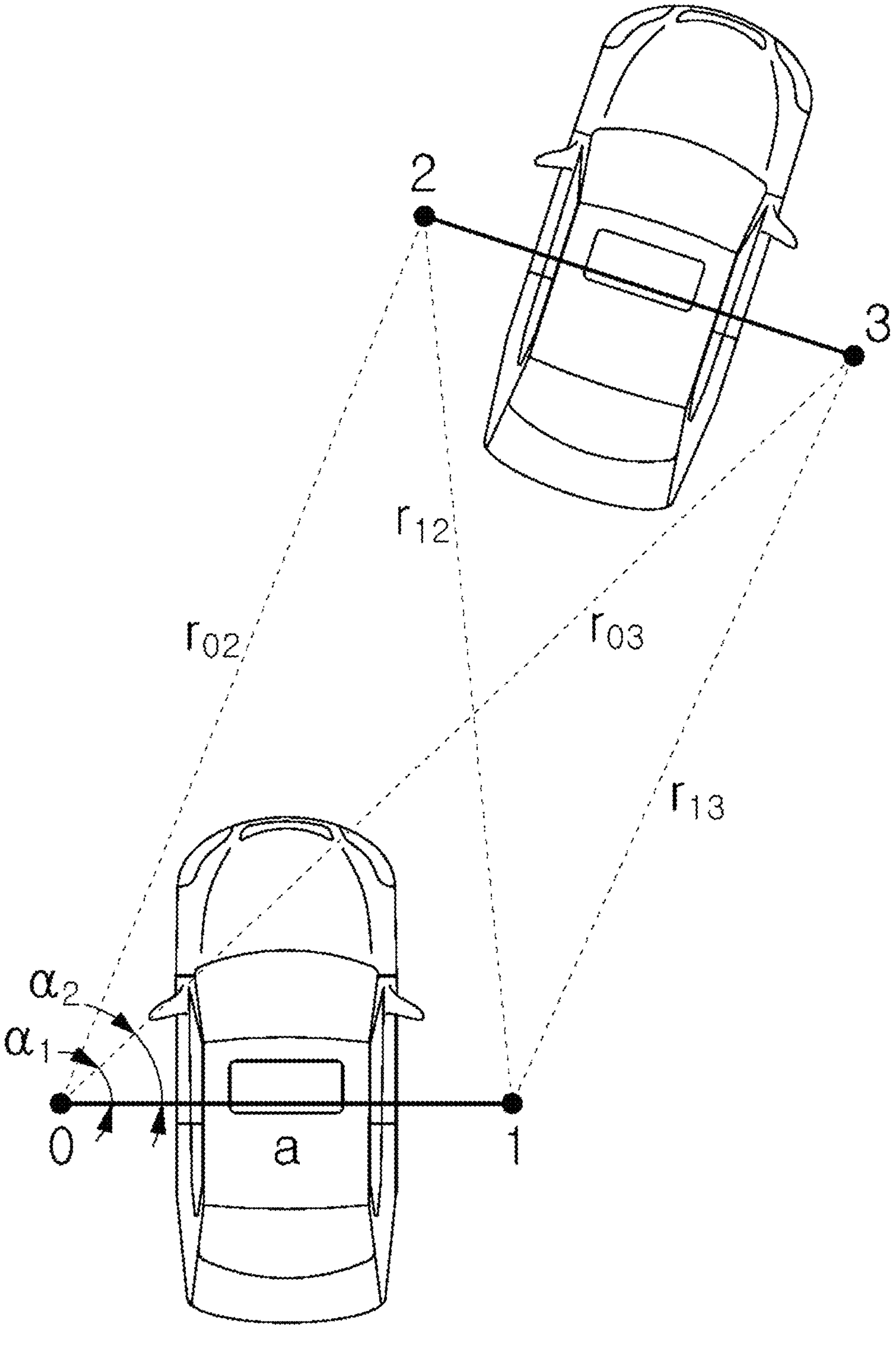
FIG. 4 is a view illustrating a method of estimating relative locations between the leading vehicle and the following vehicle, according to an embodiment of the present disclosure.

FIG. 4 is a view illustrating a method of estimating relative locations between the leading vehicle and the following vehicle. UWB sensors 1 and 2 are located on the following vehicle, UWB sensors 2 and 3 are located on the leading vehicle, and all of UWB sensors are marked as nodes 0, 1, 2, and 3. r denotes a location vector between positioning nodes.

Through positioning using the UWB sensors of the leading vehicle and the following vehicle, the location vectors between the four nodes (nodes 0, 1, 2, and 3), four angles (four angles between node connection lines), and two triangles may vary according $$h(X) = \left\| R + C_L^F(\gamma_{L,i} - \gamma_{F,j}) \right\| \quad \text{(Equation 11)}$$

to vehicle information (heading, speed, and yaw rate), angles α1 and α2 of the two triangles are angles between the node of the leading vehicle and the reference node 0 of the following vehicle based on AOA positioning, and two-dimensional relative location and pose may be calculated through correlation between the nodes 0, 1, 2, and 3. The pose is related to the location or attitude (direction) of the Adjacent vehicle and is an expression of heading and rotation.

The left side of Equation 11 is the relative location between vehicles, R of the right side denotes a relative location vector between the Ego vehicle and the Adjacent vehicle.

$$C_L^F$$

is a rotational matrix for coordinate system transformation of the vehicle and is the rotational matrix related to the leading vehicle and the following vehicle through Equation 7 of the relative direction L/F as the relative location with the Adjacent vehicle is changed due to the movement of the Ego vehicle. h(X) denotes a distance between the Ego vehicle and the Adjacent vehicle or a state variable based on the distance and is a dynamic distance change between the vehicles considering the relative location (R) and relative speed (V) between the vehicles.

(Step 4) Compensation for UWB Sensor Error and Ranging Error

Since location estimation precision according to the location of the node of the digital key system (the UWB sensor) mounted in the vehicle is diluted to affect location estimation, errors may be corrected to be irrelevant to the correlation between each geometric node location based on one anchor and one tag.

$$X = [R_x \;\; R_y \;\; \psi_{L/F} \;\; v_L \;\; d_L]^T \qquad \text{(Equation 12)}$$

A state vector of Equation 12 may be determined based on, or extracted from, Equation 11.

Figure 5:
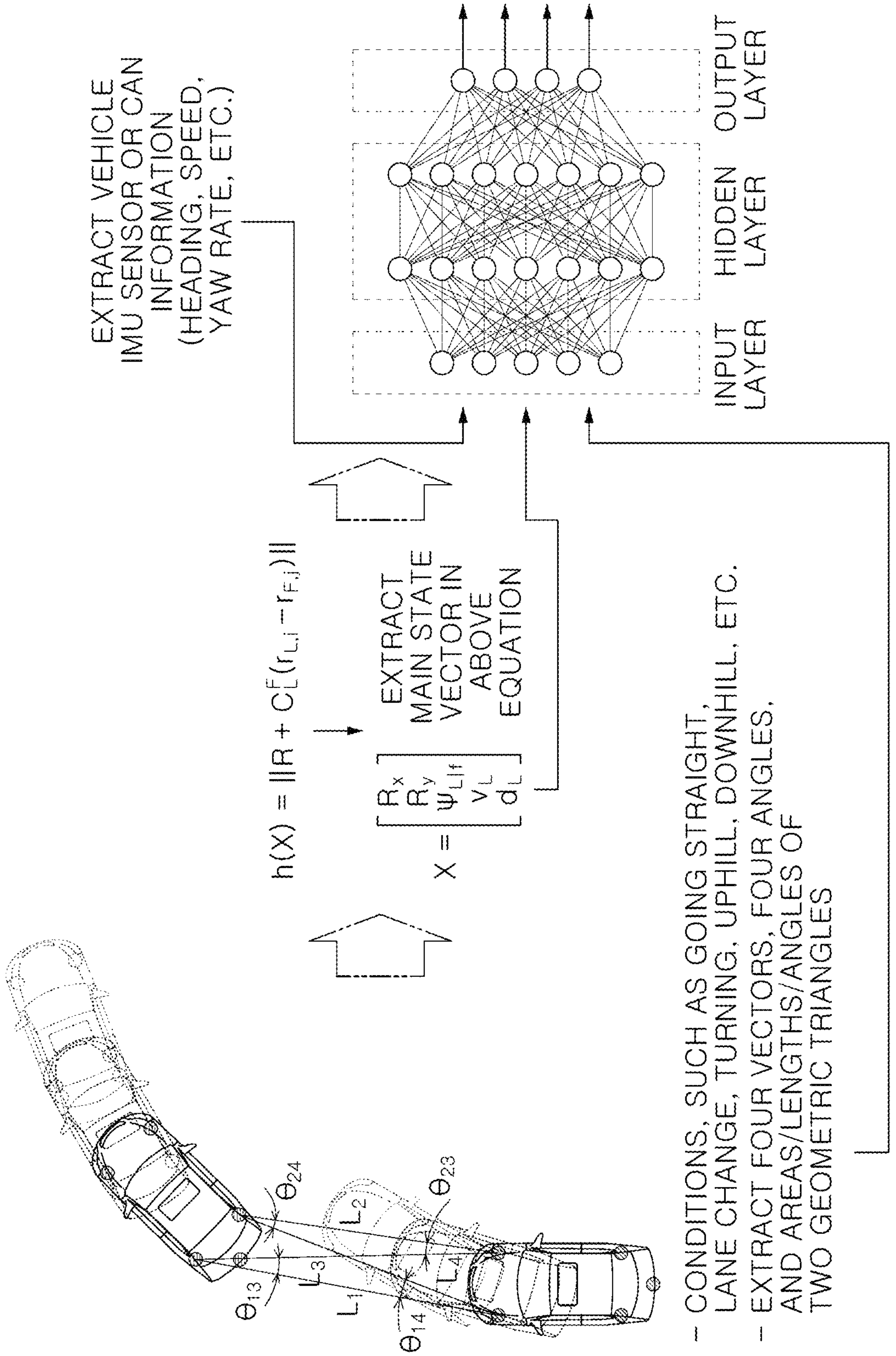
FIG. 5 is a view illustrating input data of reinforcement learning in a method of estimating relative locations between a leading vehicle and a following vehicle, according to an embodiment of the present disclosure.

UWB errors are caused by location estimation errors due to data dropout and multi-route effects according to traveling environment factors. These errors have limitations in error correction using the least mean square or extended Kalman filter with respect to Equation 11. FIG. 5 illustrates a technique to continuously minimize errors through deep learning with reinforcement learning by acquiring vector values related to the state behaviors of the following and leading vehicles, according to an embodiment.

First, as input data, in addition to the state vector, location vectors of four positioning nodes (nodes 0, 1, 2, and 3) collected from the UWB sensors of the following and leading vehicles, four angles (angles, for example, $\alpha_1$ and $\alpha_2$, between the nodes of the leading vehicle with respect to the nodes of the following vehicle), and areas/lengths/inner angles ($\theta$) of two geometric triangles are added. Further, the heading, vehicle speed, and yaw rate that are determined based on, or extracted from, a vehicle IMU sensor or CAN information are added.

The input data may be input according to traveling conditions, such as going straight, lane change, turning, uphill, downhill, etc. of the following and leading vehicles. Thereafter, real-time errors may be corrected through deep learning reinforcement learning, and a matching error with vehicle information, such as heading, a vehicle speed, and a yaw rate, may continuously be corrected in real time using a reward function within a predetermined range (e.g., 2%). Accordingly, reinforcement learning to minimize errors between an actual state and target state of the vehicle is applied. In an embodiment, the matching error refers to a difference between the actual state and the target state. The heading, speed, yaw rate, etc. may be provided from the Adjacent vehicle leading the Ego vehicle.

It is noted that the UWB sensor is only an example of a positioning sensor and the present disclosure is not necessarily limited to the UWB sensor.

Although some embodiments of the present disclosure are described above for illustrative purposes, the present disclosure is not necessarily limited to these embodiments. Rather, various substitutions, changes, and modifications are possible without departing from the technical spirit of the present disclosure. Accordingly, the above description does not limit the scope of the present disclosure, which is determined by the appended claims and equivalents thereof.

What is claimed is:

1. A method for vehicle-to-vehicle ranging control applying reinforcement learning using a positioning sensor, the method comprising:

performing, by a vehicle controller of a first vehicle, reinforcement learning for ranging correction between the first vehicle and a second vehicle based on i) vehicle information of the first vehicle and the second vehicle and ii) information of positioning nodes of the first vehicle and the second vehicle, wherein the second vehicle is a leading vehicle and the first vehicle communicates with and follows the second vehicle.

2. The method of claim 1, wherein performing reinforcement learning includes using, as input data, one or more of location vectors, angles, or geometric triangles between a positioning node of the first vehicle and a positioning node of the second vehicle.

3. The method of claim 2, performing reinforcement learning includes determining one or more of an area, a length, or an inner angle based on a geometric triangle among the geometric triangles.

4. The method of claim 2, wherein performing reinforcement learning further includes adding, to the input data, state vector including one or both of a relative location or a relative yaw rate between the first vehicle and the second vehicle and a speed and curvature of the second vehicle.

5. The method of claim 4, wherein the relative location is calculated based on a speed, rotational radius (R), and yaw rate of each of the first vehicle and the second vehicle.

6. The method of claim 1, wherein the vehicle information includes one or more of heading, speed, or yaw rate of the second vehicle.

7. The method of claim 6, wherein the yaw rate is calculated by a steering angle $\delta_l$ or $\delta_f$ of, respectively, the first vehicle and the second vehicle or effective steering angle $\delta$.

8. The method of claim 1, performing reinforcement learning includes applying a reward function so that a matching error with the vehicle information is within a predetermined range.

9. The method of claim 1, wherein the positioning sensor includes an ultra-wideband (UWB) sensor.

10. A method for vehicle-to-vehicle ranging control applying reinforcement learning using a positioning sensor, the method comprising:

determining one or more of location vectors, angles, or geometric triangles at a positioning node of each of a first vehicle that is turning and a second vehicle leading the first vehicle;

determining a state vector of relative motion of the second vehicle with respect to the first vehicle;

determining one or more of heading, a speed, or a yaw rate for the second vehicle; and performing, by a vehicle controller of the first vehicle, reinforcement learning for ranging correction between the first vehicle and the second vehicle as input data of deep learning, the reinforcement learning including using one or more of the state vector, the location vectors, the angles, or the geometric triangles that are determined based on the positioning node of each of the first vehicle and the second vehicle and one or more of the heading, the speed, or the yaw rate that are determined for the of the second vehicle as input data of deep learning.

11. The method of claim 10, wherein the state vector includes one or both of a relative location and a relative yaw rate between the first vehicle and the second vehicle and a speed and curvature of the second vehicle.

12. The method of claim 10, wherein performing reinforcement learning includes determining one or more of an area, a length, or an inner angle based on a geometric triangle among the geometric triangles.

13. The method of claim 10, wherein a relative speed of the relative motion is calculated based on a speed, rotational radius (R), and yaw rate of each of the second vehicle and the first vehicle.

14. The method of claim 10, wherein the state vector includes relative locations and relative yaw rates of the first vehicle in x and y directions with respect to the second vehicle.

15. The method of claim 10, wherein the yaw rate is calculated based on a steering angle $\delta_l$ or $\delta_f$ of, respectively, the first vehicle and the second vehicle, or effective steering angle $\delta$.

16. The method of claim 10, performing reinforcement learning includes applying a reward function so that a matching error with vehicle information of the first vehicle and the second vehicle is within a predetermined range.

17. The method of claim 10, wherein the positioning sensor includes an ultra-wideband (UWB) sensor.

18. A method for vehicle-to-vehicle ranging control applying reinforcement learning using a positioning sensor, the method comprising:

determining one or more of location vectors, angles, or geometric triangles at a positioning node of each of a turning first vehicle and a second vehicle leading the turning first vehicle;

determining a state vector based on relative motion of the second vehicle with respect to the turning first vehicle;

determining one or more of heading, a speed, or a yaw rate for the second vehicle; and performing, by a server that communicates with the turning first vehicle and the second vehicle, reinforcement learning for ranging correction between the turning first vehicle and the second vehicle using one or more of the state vector, the location vectors, the angles, or the geometric triangles that are determined at the positioning nodes of the turning first vehicle and the second vehicle and one or more of the heading, the speed, or the yaw rate that are extracted from the second vehicle as input data of deep learning.

* * * * *